UNITED STATES PATENT OFFICE.

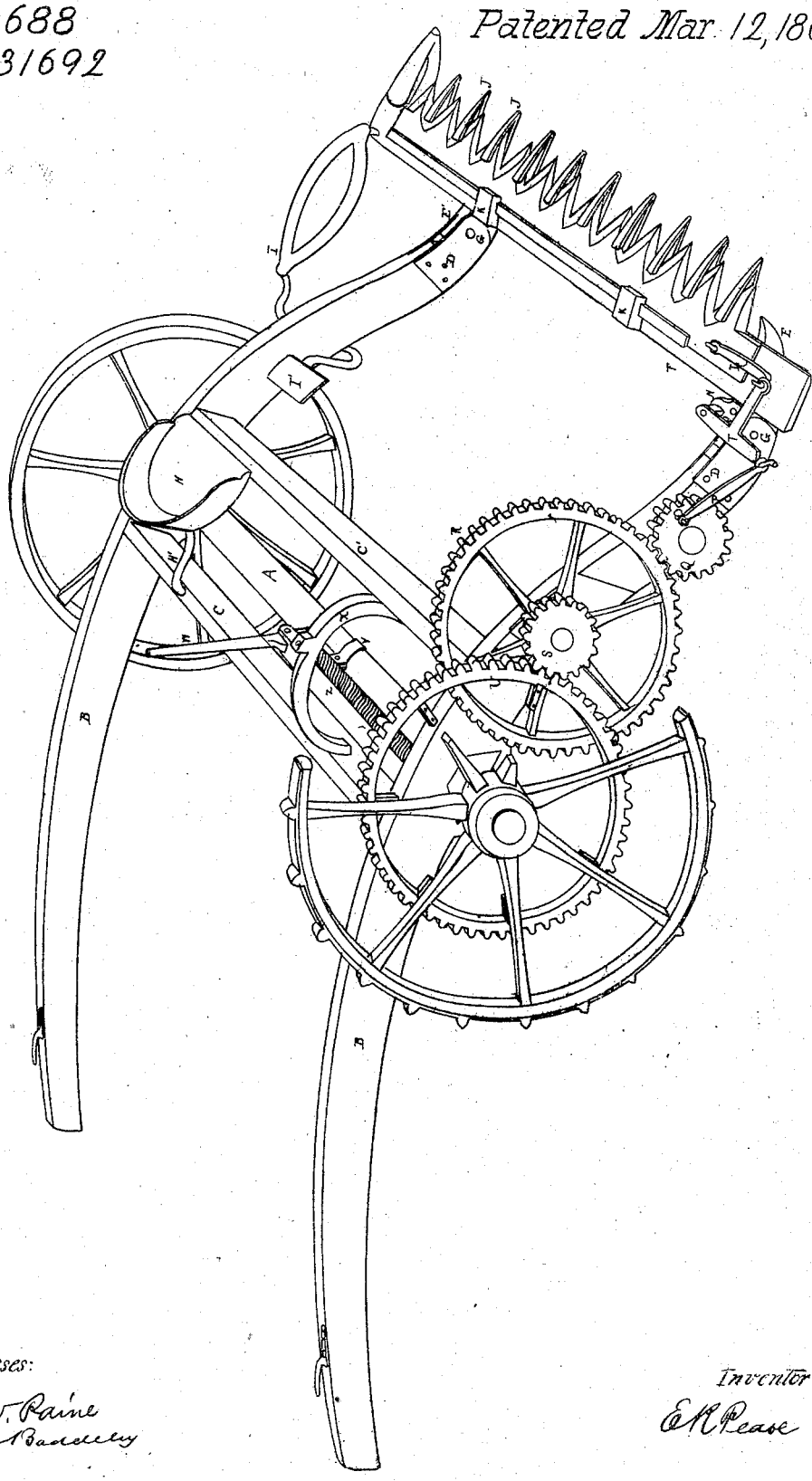

EDWIN R. PEASE, OF POUGHKEEPSIE, ASSIGNOR TO RICHARD P. PEASE, OF BROOKLYN, NEW YORK.

IMPROVEMENT IN MOWING-MACHINES.

Specification forming part of Letters Patent No. 31,692, dated March 12, 1861.

*To all whom it may concern:*

Be it known that I, EDWIN R. PEASE, of the city of Poughkeepsie, in the county of Dutchess and State of New York, have invented certain new and useful Improvements in Machines for Harvesting Grass, Grain, &c.; and I do hereby declare that the same are described in the following specification and drawing.

The nature of my invention and improvements consists in the arrangement of devices hereinafter described.

The accompanying drawing is a representation of a harvester with my improvements.

A is the axle, fitted to turn freely, and also to traverse in the shafts B B. To this axle both wheels are firmly fastened, so that the axle turns with the wheels, one of which wheels may be provided with projections, as shown in the drawing, to prevent it from slipping as it rolls on the ground. The shafts B B are made in the form shown, and extend back behind the axle, so that the horse is harnessed between and to the rear ends of the shafts, with his head toward the axle, so as to push the machine along before him into the grass or grain to be harvested. The shafts are connected each side of the axle by the bars C C', forming the frame of the machine. The plates D D are fastened to the front ends of the shafts, and the runners E E, which support and carry the finger-bar F, and to which it is fastened, are hinged between the plates D D by the pins G G, as shown in the drawing. By this arrangement the finger-bar vibrates freely and accommodates itself to the uneven surface of the ground over which it passes.

H is a seat for the driver or leader of the horse. It is supported by the stand H', fastened to the bar C.

To enable the driver to raise the finger-bar to pass over stones, stumps, and other obstructions, the lever I is made in the form shown and fastened to the finger-bar, and bent so as to pass under the shaft, with a plate, I', on the end of it, so that the driver, by applying his foot to the plate, can depress the lever and raise the finger-bar and fingers while it is passing over stones, stumps, &c., and then let it drop again. The fingers are made in form shown at J J and fastened to the bar F, and the zigzag cutters work through the fingers to sever or cut the grain or grass harvested, which falls back over the finger-bar. The cutter-bar is arranged to traverse under the brackets K K, fastened to the finger-bar. It is traversed by the link L, which connects it to the T-shaped lever T, which is made in the form shown in the drawing, and vibrates on a pin, M, in the stand N, fastened to the runner E. One arm of the lever T is connected by the link P to the crank-pin in the pinion Q, which turns on a stud in the shaft B, and is driven by the gear R, which also turns on a pin in the shaft Q, and has the pinion S fastened to it, which is driven by the gear U, fastened to one of the wheels on which the machine travels. Thus it will be apparent that as the wheel is turned, when the machine is pushed forward, the cutter will be vibrated by means of the gearing, links, and lever described.

To enable the driver to stop the cutting apparatus, the journals of the axle are made longer than the thickness of the shafts, to allow the axle to traverse in the shafts, or the shafts to traverse on the axle; and there is a score turned in the axle, to which the strap V is fitted, which is connected by a link to the lever W, which has its fulcrum on the curved bar X, fastened to the bars C C', so that the driver can vibrate the lever W and traverse the pinion S away from the gear U and stop the cutters. The spiral spring Z is placed on a pin in the shaft B, and acts against the lower end of the lever W to press the shaft B toward the wheel and keep the pinion S in gear with the wheel U, except when it is pulled out by the driver.

The above machine may be made light, so as to be pressed or pushed forward by the laborer.

I believe I have described and represented my improvements in harvesters so as to enable any person skilled in the art to make and use them. I will now state what I desire to secure by Letters Patent, to wit:

The dividing-lever I, arranged in relation to the main frame and driver's seat substantially as described, for operating the finger-bar in the manner and for the purpose set forth.

E. R. PEASE.

Witnesses:
GEO. W. PAINE,
GEORGE BADDELEY.